(12) United States Patent
Kim et al.

(10) Patent No.: US 8,868,953 B2
(45) Date of Patent: Oct. 21, 2014

(54) IMAGE FORMING APPARATUS AND METHOD OF CONTROLLING POWER CONSUMPTION THEREOF

(75) Inventors: Dong-kyu Kim, Suwon-si (KR); Min-seon Kim, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 12/652,776

(22) Filed: Jan. 6, 2010

(65) Prior Publication Data

US 2010/0174935 A1    Jul. 8, 2010

(30) Foreign Application Priority Data

Jan. 6, 2009   (KR) .................. 10-2009-0000889

(51) Int. Cl.
*G06F 1/00*       (2006.01)
*G06F 1/32*       (2006.01)
*H04N 1/00*       (2006.01)
*G03G 15/00*      (2006.01)

(52) U.S. Cl.
CPC .... *H04N 1/00888* (2013.01); *H04N 2201/0081* (2013.01); *H04N 2201/0093* (2013.01); *H04N 2201/0082* (2013.01); *H04N 2201/0094* (2013.01); *H04N 1/00891* (2013.01); *G03G 15/5004* (2013.01); *H04N 2201/0091* (2013.01); *H04N 1/00885* (2013.01)
USPC ........... 713/324; 713/300; 713/320; 713/323; 709/220; 347/19

(58) Field of Classification Search
USPC .................. 713/300, 320, 323, 324; 709/220; 347/19
See application file for complete search history.

(56) References Cited

U.S. PATENT DOCUMENTS

| 6,166,355 A | 12/2000 | Watanabe et al. |
|---|---|---|
| 7,738,999 B2 * | 6/2010 | Petite .................... 700/295 |
| 7,971,079 B2 | 6/2011 | Ezura |
| 8,001,398 B2 | 8/2011 | Tamasaki |
| 2004/0158755 A1 | 8/2004 | Mitsubori et al. |
| 2004/0158775 A1 | 8/2004 | Shibuya et al. |
| 2004/0175200 A1 | 9/2004 | Namura |
| 2007/0047998 A1 | 3/2007 | Wantanabe et al. |

(Continued)

FOREIGN PATENT DOCUMENTS

| CN | 1217488 | 5/1999 |
|---|---|---|
| CN | 101060580 | 10/2007 |

(Continued)

OTHER PUBLICATIONS

European Search Report issued Jun. 10, 2010 in EP Application No. 09176521.4.

(Continued)

*Primary Examiner* — Michael J Brown
(74) *Attorney, Agent, or Firm* — Stanzione & Kim, LLP

(57) ABSTRACT

A method of controlling power consumption of an image forming apparatus includes outputting information regarding power consumption of a plurality of operation units if a power consumption check mode is set, performing power save operation in which at least one operation unit from among the plurality of operation units is turned on and the remaining operation units are turned off if a power save mode is set. Accordingly, on/off of the plurality of operation units may be controlled in the power save mode based on power consumption of each of the operation units.

60 Claims, 9 Drawing Sheets

(56) References Cited

U.S. PATENT DOCUMENTS

| | | |
|---|---|---|
| 2007/0135973 A1 | 6/2007 | Petite |
| 2007/0250733 A1 | 10/2007 | Ezura |
| 2008/0028241 A1 | 1/2008 | Tamasaki |
| 2008/0201594 A1* | 8/2008 | Narushima .................... 713/324 |
| 2009/0077399 A1* | 3/2009 | Noda et al. .................... 713/320 |

FOREIGN PATENT DOCUMENTS

| | | |
|---|---|---|
| CN | 101114142 | 1/2008 |
| EP | 0917008 | 5/1999 |
| EP | 1990685 | 11/2008 |

OTHER PUBLICATIONS

Chinese Office Action dated Jul. 30, 2013 issued in CN Application No. 200910225093.7.

Chinese Office Action issued in Application No. 200910225093.7 on Apr. 18, 2014.

Chinese Office Action issued in Application No. 200910225093.7 on Aug. 7, 2014.

* cited by examiner

FIG. 2

| OPERATION MODE | POWER CONSUMPTION OF UNIT TIME | OPERATION TIME PER DAY | ULTIMATE POWER CONSUMPTION |
|---|---|---|---|
| Simplex Mono | 10 | 10 | 100 |
| Simplex Color | 12 | 20 | 240 |
| Duplex Mono | 8 | 10 | 80 |
| Duplex Color | 9 | 0 | 0 |
| Color SCAN | 5 | 0 | 0 |
| Mono SCAN | 4 | 2 | 8 |
| Color Copy | 12 | 15 | 180 |
| Mono Copy | 11 | 3 | 33 |
| Power Save Mode1 | 0.2 | 60 | 12 |
| Power Save Mode2 | 0.1 | 40 | 4 |
| Power off | 0 | 0 | 0 |
| .... | ... | ... | ... |

FIG. 3

| unit | On/Off |
|---|---|
| scan | on |
| adf | off |
| fax | on |
| network | on |
| finisher | off |
| hcf | off |
| dcf | on |

IMAGE FORMING APPARATUS AND METHOD OF CONTROLLING POWER CONSUMPTION THEREOF

CROSS-REFERENCE TO RELATED APPLICATIONS

This application claims priority under 35 U.S.C. §119(a) from Korean Patent Application No. 2009-00889, filed on Jan. 6, 2009, in the Korean Intellectual Property Office, the contents of which are incorporated herein by reference in their entirety.

BACKGROUND

1. Field of the Invention

The present general inventive concept relates to an image forming apparatus and a method of controlling power consumption thereof, and more particularly, to an image forming apparatus capable of controlling operation units in the image forming apparatus according to power consumption and a method for controlling power consumption thereof.

2. Description of the Related Art

An image forming apparatus may generate, print, receive, and send image data. Examples of image forming apparatuses include printers, scanners, copiers, fax machines, and multi-function printers that integrate any combination of the functions described above.

An image forming apparatus may generally support a print mode, a scanning mode, a copy mode, and a standby mode, or a power save mode in which functions are temporarily disabled. Any of the print unit, scanning unit, and copy unit of an image forming apparatus may be turned off during a standby mode to reduce power consumption of the image forming apparatus.

A manufacturer usually determines which operation unit should be turned on/off in a standby mode, and therefore it is impossible for a user to change on/off of an operation unit in a standby mode.

If a scanning unit is set to be turned off during a standby mode by a manufacturer, a user who rarely uses a scanning unit could save energy significantly. However, if a user frequently uses the scanning unit, the user may experience inconvenience since he or she has to wait until the scanning unit wakes up out of the standby mode.

SUMMARY

The present general inventive concept provides an image forming apparatus capable of controlling on/off states of a plurality of operation units in a power save mode based on power consumption of the units and a method of controlling power consumption thereof.

Additional aspects and utilities of the present general inventive concept will be set forth in part in the description which follows and, in part, will be obvious from the description, or may be learned by practice of the general inventive concept.

Features and utilities of the present general inventive concept may be realized by a method of controlling power consumption of an image forming apparatus using a plurality of operation units. The method may include outputting information regarding power consumption of the plurality of operation units if a power consumption check mode is set, and operating a power save mode in which at least one operation unit from among the plurality of operation units is turned on and the remaining operation units are turned off if a power save mode is set.

The method may include receiving a user's command to set the power consumption check mode or the power save mode.

If the power save mode is set, information regarding power consumption of the plurality of operation units may be output first, and the plurality of operation units may be turned on or turned off.

Power consumption of the plurality of operation units may be output and it may be determined whether to turn on or turn off the plurality of operation units based on the output power consumption.

If the image forming apparatus is not used for a predetermined period of time, the power save mode may be automatically set.

If output of the information regarding power consumption of the plurality of operation units is completed, the power save mode may be automatically set.

At least one of power consumption per unit and estimated electricity fee of each of the plurality of operation units based on an operation mode may be displayed or printed.

Outputting information regarding power consumption may include analyzing a user's power usage pattern based on power consumption of each of the plurality of operation units, calculating estimated power consumption for combinations of on/off states of the plurality of operation units based on the analyzed power usage pattern, and displaying or printing the calculated estimation of power consumption.

If the power save mode is set, a user may determine which operation unit should be turned on from among the plurality of operation units.

If the power save mode is set, predetermined settings may determine which operation unit should be turned on from among the plurality of operation units.

Additional features and/or utilities of the present general inventive concept may also be realized by an image forming apparatus including a plurality of operation units, an output unit which outputs information regarding power consumption of the plurality of operation units if a power consumption check mode is set, and a control unit which turns on at least one operation unit set from among the plurality of operation units if a power save mode is set.

The image forming apparatus may further include an input unit to receive a user's command to set the power consumption check mode or the power save mode.

The control unit may output information regarding power consumption of the plurality of operation units first if the power save mode is set, and may turn on or off the plurality of operation units.

The control unit may output power consumption of the plurality of operation units and may turn on or off of the plurality of operation units based on the output power consumption.

The control unit may set the image forming apparatus to the power save mode if the image forming apparatus is not used for a predetermined period of time.

The control unit may set the image forming apparatus to the power save mode automatically when output of the information regarding power consumption of the plurality of operation units is completed.

The control unit may output one of power consumption per unit time of each of the plurality of operation units and estimated an electricity fee, and may provide the output information to the output unit if the power consumption check mode is set.

If the power consumption check mode is set, the control unit may analyze a user's power usage pattern based on power consumption of each of the plurality of operation units, output an estimated power consumption for combination of on/off state of the plurality of operation units based on the analyzed power usage pattern, and provide the output estimation of power consumption to the output unit.

The control unit may receive which operation should be turned on from among the plurality of operation units from a user if the power save mode is set.

If the power save mode is set, the control unit may check a predetermined setting state and determine which operation unit should be turned on from among the plurality of operation units.

Additional features and/or utilities of the present general inventive concept may also be realized by a method of controlling power consumption of an image forming apparatus using a plurality of operation units, the method including setting a power save mode and outputting power consumption of the plurality of operation units, and determining whether to turn on or off the plurality of operation units based on the output power consumption.

Additional features and/or utilities of the present general inventive concept may also be realized by a method of controlling power consumption of a plurality of imaging devices, the method including setting a power saving mode by turning on at least one of the plurality of imaging devices and turning off at least one of the plurality of imaging devices, and entering the power saving mode.

The imaging devices may be components of a multi-function image forming apparatus. The imaging devices may include at least one of a printer, a fax, a copier, and a scanner.

Programming the controller may include receiving an input from a user.

The method may further include outputting power consumption information of the plurality of imaging devices.

The power consumption information may be output before entering the power saving mode.

The power consumption information may be output before programming the controller to enter a power saving mode.

The power consumption information may include at least one of a rate of power consumption and a cost of operation of the plurality of imaging devices.

The power consumption information may include power consumption information of a plurality of on/off combinations of the plurality of imaging devices.

Programming the controller may include receiving a user input to select at least one of the plurality of imaging devices to turn off in a power saving mode.

Entering the power saving mode may include accessing permanent settings in memory to determine which of the plurality of imaging devices to turn off in a power saving mode.

The method may further include programming a controller to enter a power consumption mode to analyze power consumption of the plurality of imaging devices and entering the power consumption mode.

Programming the controller to enter a power consumption mode may include receiving an input from a user.

Entering the power consumption mode may include outputting data corresponding to a power consumption of the plurality of imaging devices.

Outputting data may include outputting power consumption data corresponding to a current level of power consumption of the plurality of imaging devices. Outputting data may include at least one of printing data or displaying data on a display device. Outputting data may include outputting power consumption data corresponding to a cumulative power consumption of the plurality of imaging devices over a predetermined period of time. Outputting data may include outputting power consumption levels of at least one combination of at least one imaging device to be turned on and at least one imaging device to be turned off.

The at least one combination may be based on the monitored usage of the plurality of imaging devices over a predetermined period of time.

Entering the power consumption mode may include monitoring power consumption of the plurality of imaging devices. The method may further include outputting a notice when power consumption of the plurality of imaging devices reaches a predetermined level. The method may further include outputting power consumption data corresponding to the monitored usage of the plurality of imaging devices over a predetermined period of time.

Additional features and/or utilities of the present general inventive concept may also be realized by an energy-saving system including a plurality of imaging devices and a controller connected to each of the plurality of imaging devices to place the plurality of imaging devices in a power saving mode in which at least one of the plurality of imaging devices is turned on and at least one of the plurality of imaging devices is turned off.

The plurality of imaging devices may be components of a multi-function imaging apparatus.

The controller may be a component of the imaging apparatus. Alternatively, the controller may be externally connected to the imaging apparatus.

The energy-saving system may further include a user interface to receive a user input to select the at least one imaging device to turn on and the at least one imaging device to turn off in the power saving mode.

The user interface may display power consumption information of the plurality of imaging devices prior to receiving the user input.

The energy-saving system may further include a network connection to receive data corresponding to a cost of power consumption of each of the plurality of imaging devices, and the user interface may display the data corresponding to the cost of power consumption of each of the plurality of imaging devices prior to receiving the user input.

The user interface may include at least one of an electronic display and a printer.

The printer may print the power consumption information of the plurality of imaging devices.

The plurality of devices may be separate imaging apparatuses connected to a network.

The controller may be a computer including a processor and memory connected to the network. Alternatively, the controller may be located in one of the separate imaging apparatuses.

Additional features and/or utilities of the present general inventive concept may also be realized by a computer-readable medium having stored thereon a program to execute a method, the method including directing a plurality of imaging devices to enter a power saving mode by turning on at least one of the plurality of imaging devices and turning off at least one of the plurality of imaging devices.

The method may further include receiving a user input to select the at least one of the plurality of imaging devices to turn on in the power saving mode and the at least one of the plurality of imaging devices to turn off in the power saving mode.

The method may further include calculating an estimated power consumption of a plurality of combinations of on/off states of the plurality of imaging devices, and outputting the estimated power consumption of the plurality of combinations to an output unit before receiving the user input.

The power consumption data may include cost data of power consumption.

The plurality of imaging devices may be components of a single multi-function imaging apparatus, and the computer-readable medium may be connected to the imaging apparatus.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 2 is a schematic view illustrating power consumption for each operation mode;

FIG. 3 is a schematic view illustrating an example of a UI window which receives information regarding whether a plurality of operation units are operated in a power save mode;

DETAILED DESCRIPTION OF THE EMBODIMENTS

Figure 1A:
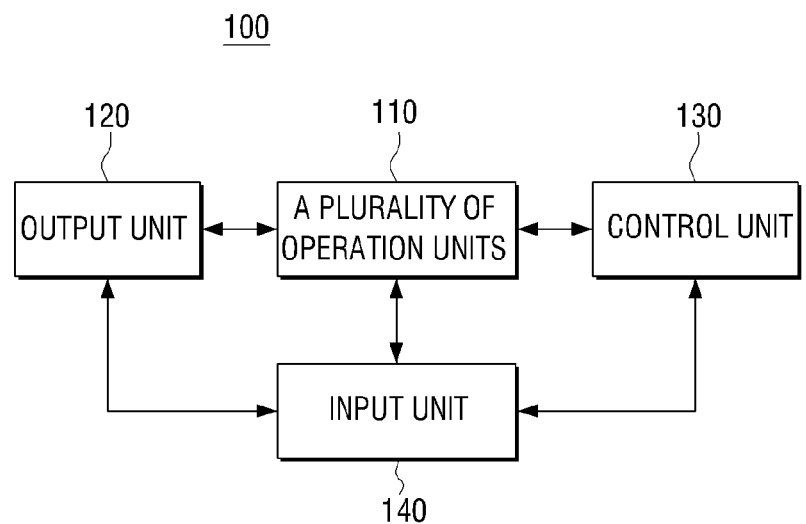
FIGS. 1A-1D illustrate configurations of a plurality of imaging devices according to embodiments of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

FIG. 1A is a schematic view illustrating an energy-saving system, such as an image forming apparatus according to an exemplary embodiment of the present general inventive concept. An image forming apparatus 100 includes a plurality of operation units 110, an output unit 120, a control unit 130, and an input unit 140.

The plurality of operation units 110 may be various operation units included in the image forming apparatus 100. The plurality of operation units 110 may be one of a print unit, a copy unit, a scanning unit, a fax unit, an auto document feeder (ADF) unit, a network unit, a finisher unit, a high capacity feeder (HCF) unit, and double capacity feeder (DCF) unit, for example. The image forming apparatus 100, according to the exemplary embodiment of the present general inventive concept, may be a multi function printer which includes various operation units 110. The operation units 110 may include a pickup/feed unit 110 to feed a printing medium to another operation unit and/or a discharge unit to discharge the printing medium after operation of the units. The operation units 110 may perform additional operations including, for example, forming an image, scanning an image, faxing an image, etc.

The output unit 120 may output information regarding power consumption of the plurality of operation units 110 when a power consumption check mode is selected. The information regarding power consumption includes unit power consumption according to an operation mode, operation time per day, final power consumption, an estimated electricity fee based on the final power consumption, and estimated power consumption in various scenarios.

If a power save mode is selected, the control unit 130 turns on at least one operation unit from among the plurality of operation units 110, and turns off the rest of operation units. The power save mode can also be referred to as a standby mode or a sleeping mode.

The image forming apparatus 100 may control on/off of the plurality of operation units 100 in a power save mode based on information regarding power consumption of the plurality of operation units 110 output from the output unit 120 if a power consumption check mode and a power save mode are set consecutively. The image forming apparatus 100 may output only information regarding power consumption of the plurality of operation units 110 from the output unit 120 if a power consumption check mode is selected.

The control unit 130 may turn on at least one operation unit from among the plurality of operation units 110 and turn off the rest of operation units if a power save mode is selected in the image forming apparatus 100.

If a power save mode is selected in the image forming apparatus 100, the control unit 130 may output information regarding power consumption of the plurality of operation units first, and then turn on or turn off the plurality of operation units. In other words, the control unit 130 may turn on or turn off the plurality of operation units after checking information regarding power consumption.

The image forming apparatus 100 may output power consumption data of the plurality of operation units to determine whether to turn on or turn off the plurality of operation units based on the output power consumption data. For example, after the image forming apparatus 100 outputs the power consumption data, a user may select via a user interface window (not shown) which one or more of the plurality of operation units to turn on or turn off.

The image forming apparatus 100 may further include the input unit 140. The input unit 140 may receive a user's command to enter a power consumption check mode or a power save mode. The user may input a command via a UI screen (not shown) of the image forming apparatus 100 or a display screen of an external host PC. The image forming apparatus 100 may automatically enter a power saving mode if it is not used for a predetermined period of time.

Figure 1B:
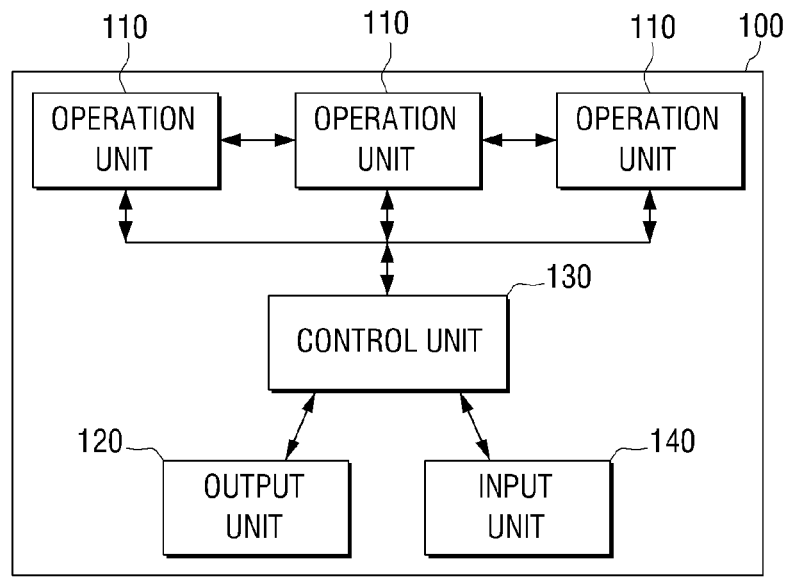

FIG. 1B is a block diagram illustrating an energy-saving system including the plurality of operation units 110, such as imaging devices, within a single image forming apparatus 100. As illustrated in FIG. 1B, the operation units 110 may interact with only the control unit 130, which in turn interacts with the input unit 140 and the output unit 120.

Figure 1C:
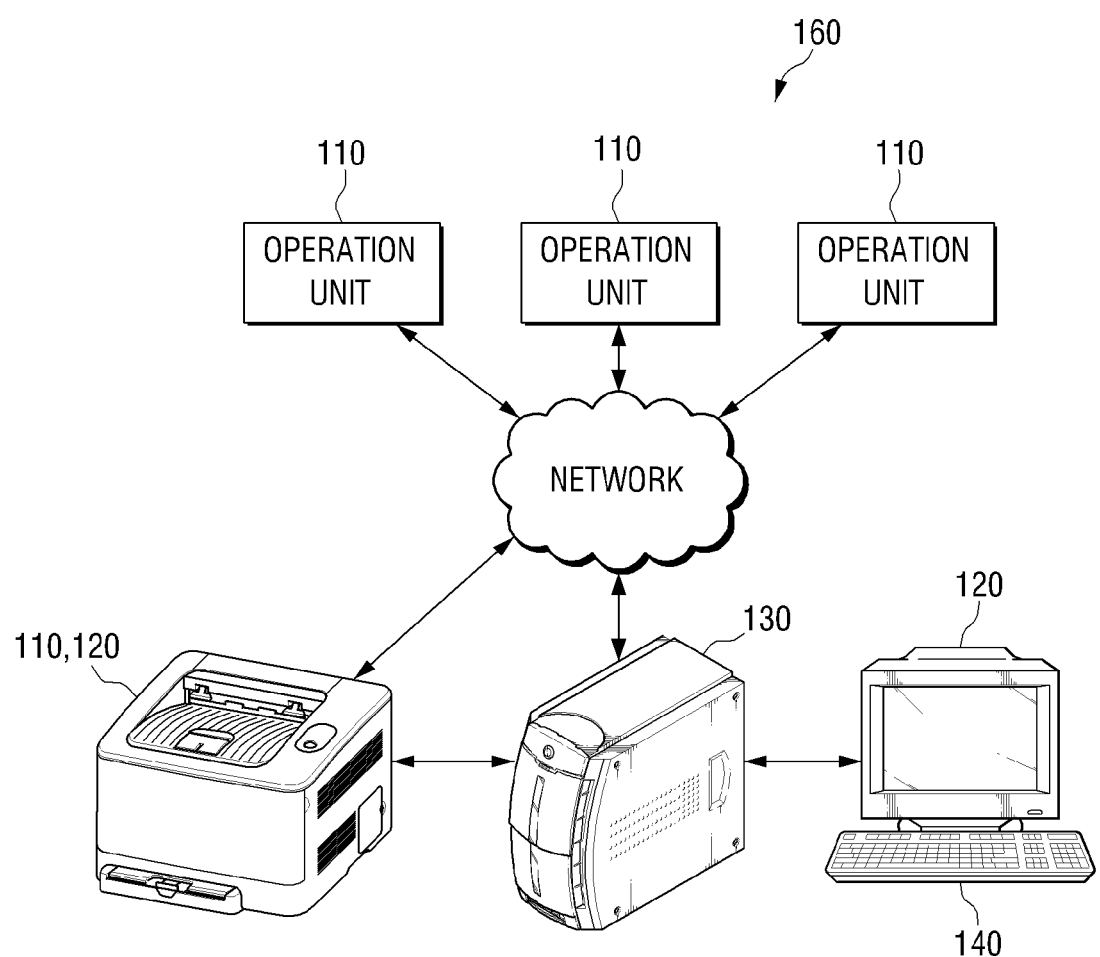

FIG. 1C illustrates an energy-saving system, such as an imaging system 160 including a plurality of operation units 110, such as imaging devices, connected to a network 150. The network 150 may be a local area network (LAN) or a wide area network (WAN), such as the Internet. In FIG. 1C, the control unit 130 may be a computer or server connected to the network 150. The computer may include at least one processor, memory, communication ports, hard drives, and other hardware. The control unit 130 may also be connected to an input unit 140, including a monitor and a keyboard, for example. The control unit 130 may also be connected to an output unit 120. The output unit 120 may be an operation unit 110, or it may be independent of the operation units 110. Although a printer is shown in FIG. 1C, any device that outputs data, such as an LCD screen, a computer monitor, or a printer, may be used as an output unit.

Figure 1D:
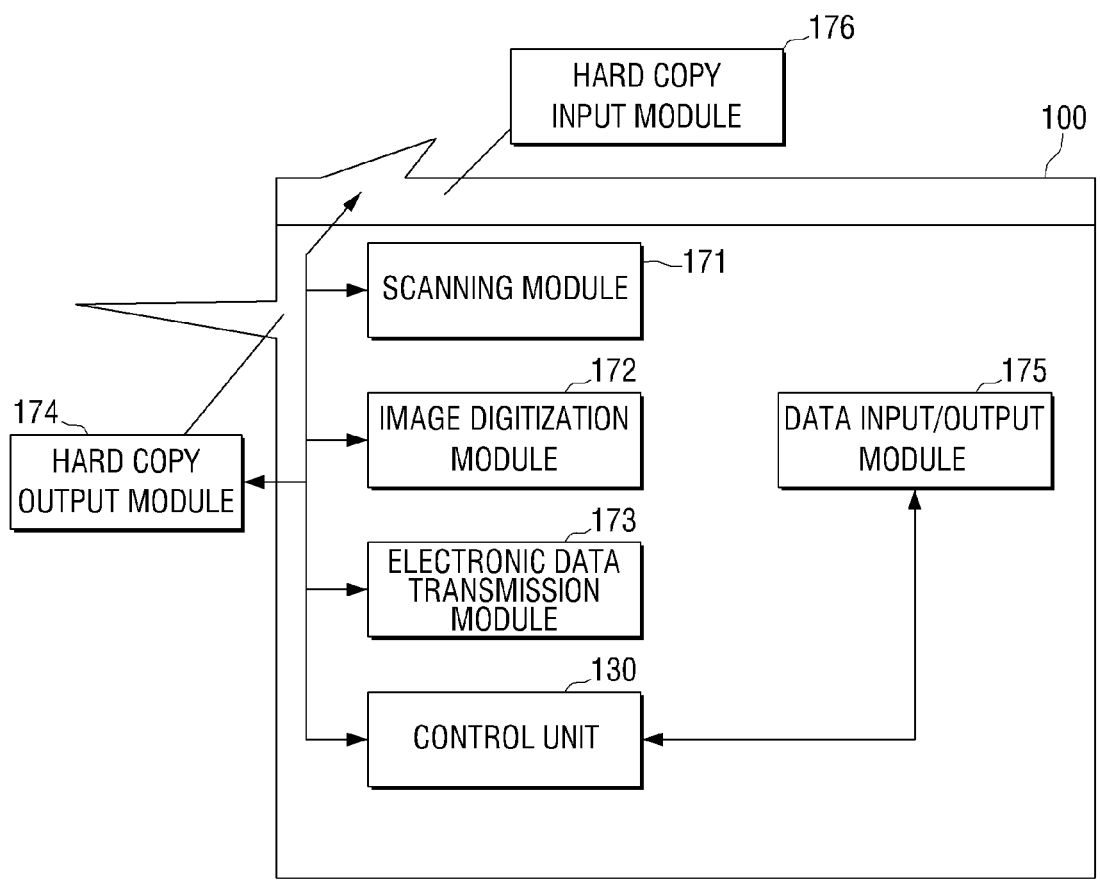

As illustrated in FIG. 1D, functions of the operation units 110 may overlap, so that one or more operation units 110 may utilize the same physical components within an image forming apparatus 100 or an image forming system. FIG. 1D illustrates functional units within an image forming apparatus 100. A scanning module 171 may include motors, light generators, sensors, power supply components, processors, memory, and other circuitry. The scanning module 171 may scan a physical image and convert the physical image to a digital image.

The physical image may be input via a hard copy input module 176 that may include motors, feeders, and other circuitry. For example, the hard copy input module 176 may include an automatic feeder to feed multiple sheets of paper into the scanning module 171.

Data may also be received into the image forming apparatus 100 via an electronic data transmission module 173. The electronic data transmission module 173 may include a network connection port, a memory card port, a hard or floppy disk drive, a telephone port, or any other data transmission port or receptacle. The data received by the data transmission module 173 may correspond to a previously-digitized image, for example.

Digital data from the scanning module 171 or the electronic data transmission module 173 may be input into an image digitization module 172 that may convert the received image data into a format that may be manipulated or stored by the image forming apparatus 100. The image digitization module may include memory, processors, and other circuitry to store and manipulate electronic data.

Data may also be input to the image forming apparatus via a data input/output module 175. The data input/output module 175 may include an LCD screen and a keypad, for example. The data input/output module 175 may also include memory, processors, and other circuitry to receive data, to display data, and to manipulate stored data. For example, if the data input/output module 175 displays an image scanned by the scanning module 171, the input/output module 175 may allow a user to manipulate the image and store the image in the image forming apparatus or transmit the image.

Data may be output from the image forming apparatus 100 via a hard copy output module 174, via the data input/output module 175, or via the electronic data transmission module 173. The hard copy output module 174 may include motors, light and/or head generators, a power supply, memory, processors, a sorter, a finisher, and other circuitry to output a physical representation of an image and to manipulate the physical representation.

If the image forming apparatus 100 includes operation units 110 to scan, copy, print, and fax, each of the operation units may utilize one or more of the modules of the image forming apparatus 100. For example, a copying operation unit 110 may utilize the hard copy input module 176, the scanning module 171, and the hard copy output module 174. A printing operation unit 110 may utilize the electronic data transmission module 173, the image digitization module 172, and the hard copy output module 174.

Each operation unit 110 may include hardware including memory, processors, and other circuitry to perform a specific operation, it may include a computer-readable medium having a program stored thereon to operate the modules of the image forming apparatus 100, or it may include a combination of hardware and software.

The controller 130 may be a single controller to control the normal functions of the image forming apparatus 100, or it may be a separate controller to control only the power saving mode and/or power consumption mode of the image forming apparatus. The controller 130 may be a component of the image forming apparatus 100, or it may be connected to the image forming apparatus via a communication port, such as a telephone line, an Ethernet line, or a wireless connection, for example.

FIGS. 1A-1D may be alternatively described as showing a plurality of operation units 110, or imaging devices, as part of an imaging system. The system may be a network 160 of stand-alone imaging devices, a single multi-function imaging device 100, or a combination of the two. The imaging devices 110 may be controlled by a control unit 120, or a controller. The controller may be a stand-alone computer, a computing module including a processor, memory, and other circuitry integral with one or more of the operation units 110 or the multi-function imaging device 100, a computer-readable medium containing code to control the operation units 110, or any combination of the above components.

The operation units 110 may enter a power-save mode or a power-consumption mode upon receiving user input from an input unit 140. The input unit 140 may include a stand-alone input module such as a keyboard, touch-screen device, personal computer, or PDA. The input unit 140 may also be integral with any one of the operation units 110 or with a multi-function imaging apparatus 100. The user input 140 may also include a computer-readable medium such as a disk or flash drive to program the operation units 110 or the multi-function apparatus 100.

In each of the power-saving mode and the power consumption mode, the image-forming apparatus 100 or system 160 may output power saving or power consumption data. The data may be output via one of the operation units 110, such as via a printer or fax, or it may be displayed electronically, such as via a computer monitor, an LCD screen, or any other display, including an audio output. Outputting power consumption information may prompt a user to configure a power-consumption or a power-saving mode.

For example, if the user is logged on to a networked power system 160, the user may indicate via a keyboard or mouse that the system should display power consumption information on a computer monitor. The system 160 may then display the power consumption information and may either automatically set the system 160 to enter a power-saving mode or may await user input. The user may select individual operation units 110 connected within the system 160 to turn on or off during a power saving mode. The user may set alarms to notify the user when a predetermined power consumption level has been reached by one or more of the operation units or is approaching.

The controller 130 may present pre-set configurations to the user to configure the power-saving mode, or the user may select individual operation units 110. Preset configurations may include turning on some operation units 110 and turning off other operation units 110 based upon average power consumption of the operation units 110 or based upon detected use of the operation units 110.

The power-saving or power consumption modes may include monitoring the operation units 110 to detect power consumption and user habits. For example, the system 160 may determine which operation units 110 are used the most often by a user. The power-saving mode may allow a user to select times at which operation units 110 will be turned on and off, or cumulative power consumption levels after which the operation units 110 may be turned off.

FIG. 2 is a schematic view illustrating power consumption for various operation modes. For example, information regarding power consumption per unit according to various operation modes, operation time per day, and final power consumption may be displayed. The power consumption per unit may be pre-stored in a data storage unit (not shown) of the image forming apparatus 100, and it may have a fixed value. The operation time per day may be stored in a storage unit (not shown) such as a customer replaceable unit memory (CRUM), and the information may be frequently updated every day or after a month, or after any other predetermined period of time. The final power consumption may also be updated frequently. FIG. 2 illustrates operation time per day, but information regarding operation time may be stored in a data storage unit (not shown) for a certain period of time (for instance, from first to $15^{th}$ day of each month), and such information may be updated and output frequently.

The final power consumption may be measured in watt [w] or kilowatt [kw], the operation time for each day may be measured in second, minute, or hour, and the unit power consumption may be measured in [watt/minute].

To calculate at least one of power consumption per unit time and an estimated electricity fee of each of the plurality of operation units 110, power consumption for various operation modes may be considered.

For instance, when scanning on the mono image on page 1 is performed, it can be seen that "Mono SCAN" mode is operated and as much as 5 [w] is consumed in the scanning unit. However, when scanning on the color image on page 1 is performed, it can be seen that "Color SCAN" mode is operated. In this case, even if the scanning unit is operated, a different amount of power is consumed depending upon whether the mono scan or color scan is performed.

As such, the output unit 120 may display on a UI window (not shown) or print on a paper at least one of power consumption per unit time and an estimated electricity fee of each of the plurality of operation units 110. That is, the output unit 120 may output power consumption per unit time without considering operation time per day. Or, the output unit may output an expected electricity fee by taking operation time of each operation unit per each day into consideration. In this case, the estimated electricity fee may be output based on the final power consumption.

The output unit 120 may output a user's estimated power consumption by analyzing the user's power usage pattern. As illustrated in FIG. 2, a user's power usage pattern may be analyzed based on operation time of an operation unit operated in each of the operation mode per day.

For instance, if a user of the image forming apparatus 100 mostly uses a copying unit, and rarely uses a fax unit and a scanning unit, the output unit 120 analyzes the user's power usage pattern and may calculate estimated power consumption in various scenarios. More specifically, estimated power consumption can be calculated and output when only a scanning unit and a fax unit are turned on (scenario 1) in addition to the current setting (in which only a copy unit is turned on), or when a scanning unit, a copy unit, a print unit, and a fax unit are turned on (scenario 2).

The purpose of calculating the estimated power consumption is to figure out how much power is consumed in various scenarios created ultimately by the combination of on/off state of a plurality of operation units in a power save mode.

A user may be interested in reducing power consumption, or may be more interested in the time needed to turn on an operation unit which has been turned off in a power save mode. Accordingly, the output unit 120 may trade off power consumption and wake up time appropriately based on the displayed or printed estimated power consumption and power usage pattern.

In the above description, the output unit 120 directly outputs information regarding power consumption of the plurality of operation units 110. However, the control unit 130 may perform the above-mentioned functions of the output unit 120, and provide the generated information to the output unit 120.

That is, if a power consumption check mode is set, the control unit 130 may calculate one of power consumption per unit and estimated electricity fee of each of the plurality of operation units 110 and provide the information to the output unit 120.

The control unit 130 may also analyze the power usage pattern of a user based on power consumption of each of the plurality of operation units 110, calculate estimated power consumption according to the combination of on/off state of the plurality of operation units 110, and provide the calculated estimation of power consumption to the output unit 120.

FIG. 3 is a schematic view illustrating an example of a UI window which receives information regarding whether a plurality of operation units are operated in a power save mode. The UI window may also receive an input from a user regarding which operation units the user wants to turn on or off in the power save mode.

The UI window may be part of the image forming apparatus 100 and it may include or may correspond to a touch screen, a direction button, or a selection button.

The user may decide which operation unit should be turned on or turned off in a power save mode by taking into consideration power consumption information of each of the operation units and power usage pattern of a user output from the output unit 120 and selecting operation units to turn on and off via the UI window.

For instance, if a user uses a scanning unit and a fax unit frequently, the control unit 130 may turn off a finisher unit and a DCF unit to save power in a power save mode, because the finisher unit and DCF unit are not related to the scanning unit and the fax unit. Even if a user uses the scanning unit and the fax unit frequently, and the amount of power consumed by the fax unit is high, the control unit 130 may turn off the fax unit in a power save mode to reduce power consumption even though it takes a while to wake up the fax mode in a power save mode.

The control unit 130 may determine the operation mode to be turned on from among a plurality of operation units by checking a predetermined setting that has been set by a manufacturer, a vendor, or a user, for example.

Accordingly, on/off states of a plurality of operation units may be controlled in a power save mode based on power consumption, and thus power consumption may be reduced and user convenience may be enhanced.

The image forming apparatus 100 may be automatically set to a power save mode by the control unit 130 if output of information regarding power consumption of the plurality of operation units 110 is completed. Accordingly, the image forming apparatus 100 may control whether to drive each of the operation units individually based on the information regarding power consumption of the plurality of operation units 110. A user also does not have to experience inconvenience of setting a power consumption check mode and a power save mode consecutively.

Figure 4:
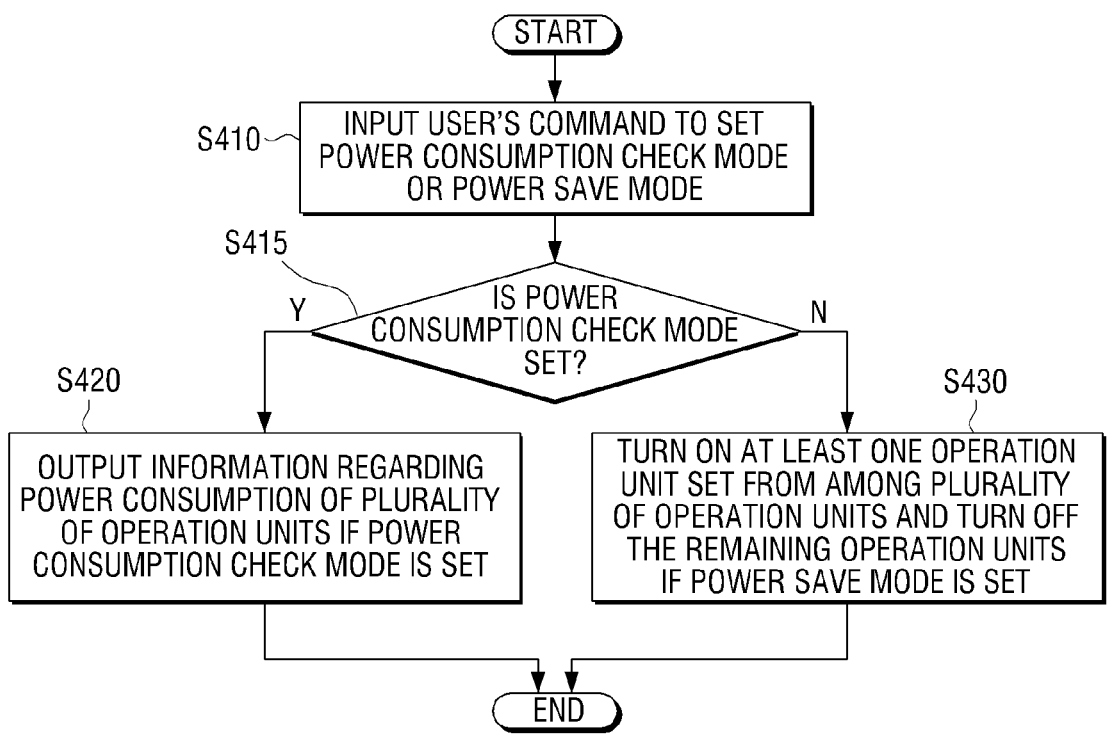
FIG. 4 is a flow chart illustrating a method of controlling power consumption of an image forming apparatus according to an embodiment of the present general inventive concept.

FIG. 4 is a flow chart illustrating a method of controlling power consumption of an image forming apparatus according to an exemplary embodiment of the present general inventive concept.

The method may include receiving a user's command to select a power consumption check mode or a power save mode in operation S410, and determining if the power consumption check mode is set in operation S415.

If the power consumption check mode is set as determined in operation S415-Y, information regarding power consumption of a plurality of operation units is output in operation S420. If a power save mode is set as determined in operation S415-N, at least one operation unit from among the plurality of operation units is turned on, and the remaining operation units are turned off in operation S430.

During the power save mode in operation S430, information regarding power consumption of the plurality of operation units may be output first, and the plurality of operation units may be turned on or turned off after the consumption information is output.

In addition, during the operation of a power save mode in operation S430, information regarding whether to turn on or off any of the plurality of operation units may be received by a user via a UI window (not shown), and based on the output power consumption, the plurality of operation units may be set to turned on or off.

Alternatively, predetermined settings may determine which operation units should be turned on from among the plurality of operation units.

A user's command to select a power consumption check mode or a power save mode may be received in operation S410 without determining whether a power consumption check mode is set in operation S415. If it is determined in operation S415 that the power consumption check mode is not set, it may be determined whether a power save mode is set (not shown).

To control on/off of all or part of the plurality of operation units in a power save mode based on information regarding power consumption of the plurality of operation units, it may be desirable to set a power save mode after setting a power consumption check mode.

Figure 5:
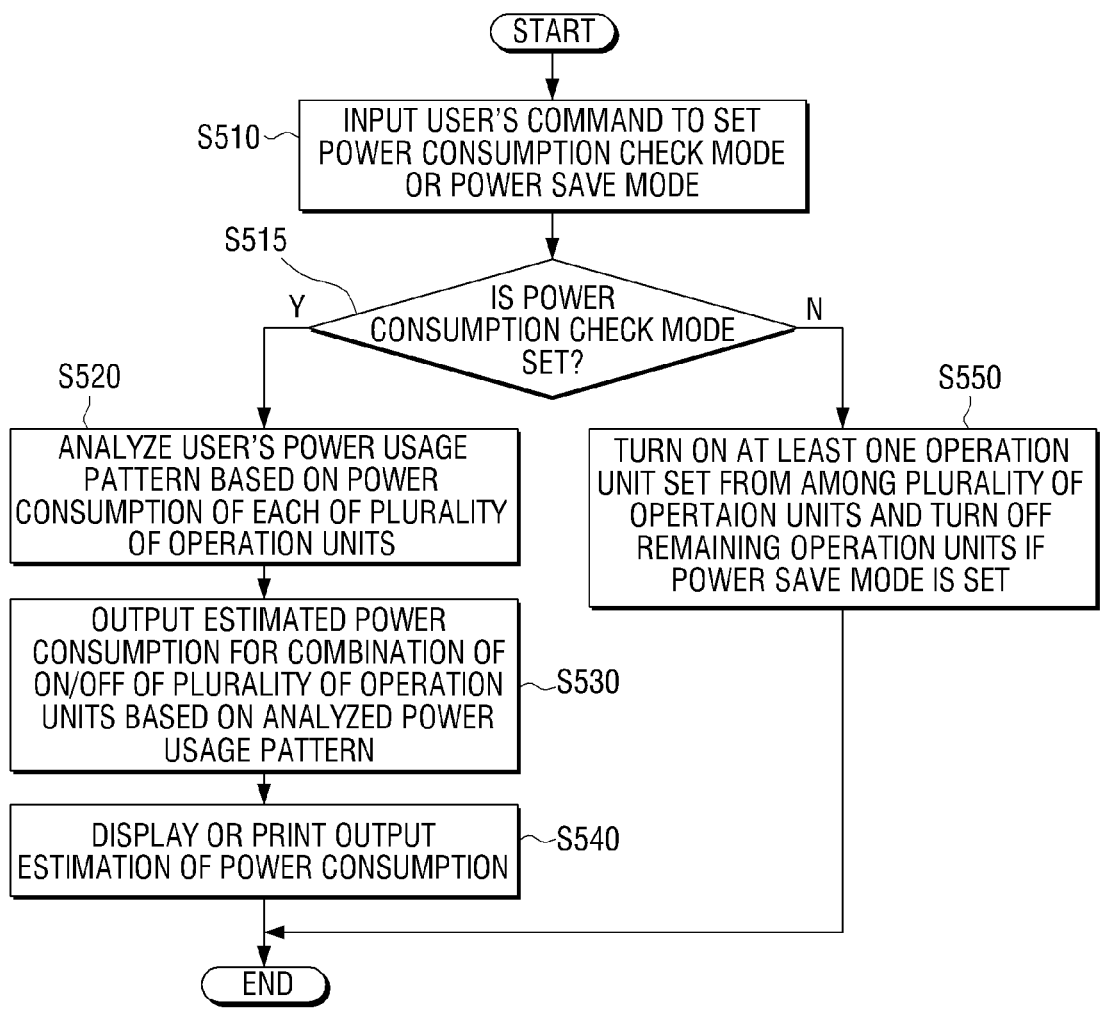
FIG. 5 is a flow chart illustrating a method of controlling power consumption of an image forming apparatus according to an embodiment of the present general inventive concept.

FIG. 5 is a flow chart illustrating a method of controlling power consumption of an image forming apparatus according to an exemplary embodiment of the present general inventive concept. Referring to FIG. 5, a user's command to select a power consumption check mode or a power save mode is received in operation S510, and it is determined whether a power consumption check mode is set in operation S515.

If a power consumption check mode is set as determined in operation S515-Y, a user's power usage pattern is analyzed based on power consumption of the plurality of operation units in operation S520. An estimated power consumption for the various combinations of on/off statuses of the plurality of operation units is calculated based on the analyzed power usage pattern in operation S530, and the calculated estimation of power consumption is displayed or printed in operation S540.

The operation after setting a power save mode is similar to the operation illustrated in FIG. 4, and thus the description thereof is omitted.

In this exemplary embodiment, power consumption may be estimated for various scenarios according to a user's power usage pattern, and based on this, on/off statuses of the plurality of operation units in a power save mode may be ultimately controlled.

Figure 6:
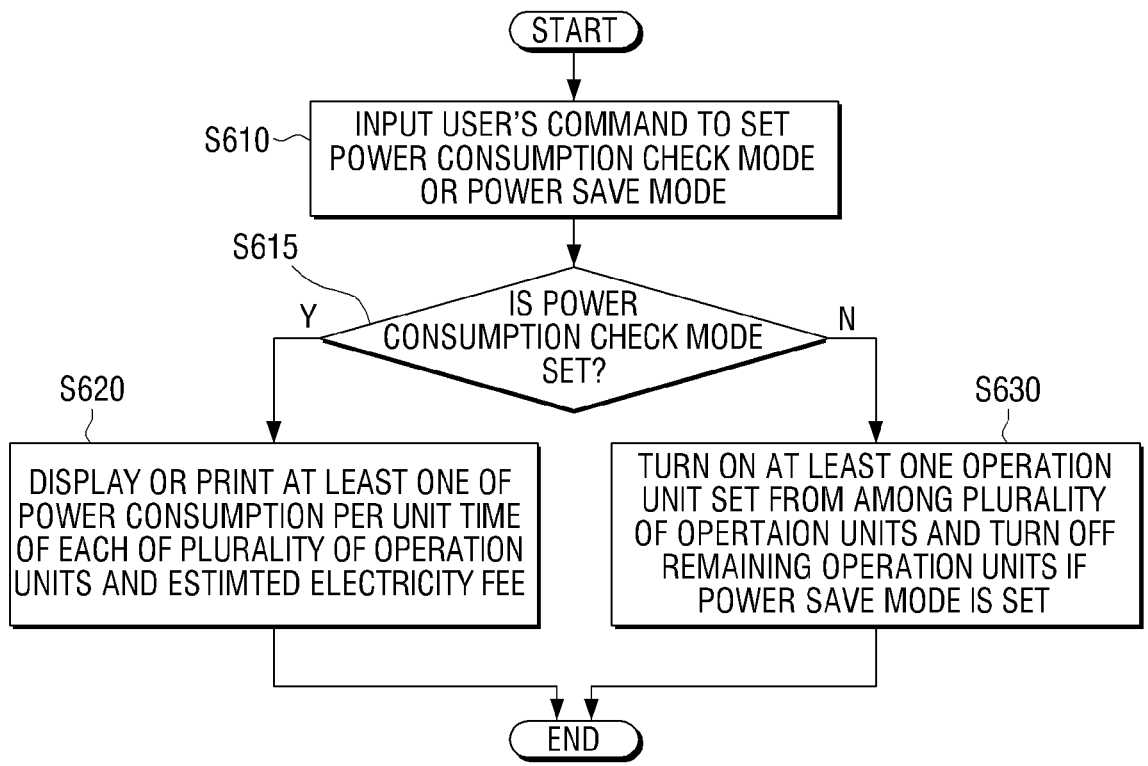
FIG. 6 is a flow chart illustrating a method of controlling power consumption of an image forming apparatus according to an embodiment of the present general inventive concept.

FIG. 6 is a flow chart illustrating a method of controlling power consumption of an image forming apparatus according to an exemplary embodiment of the present general inventive concept. A user's command to select a power consumption check mode or a power save mode is received in operation S610, and it is determined whether a power consumption check mode is set in operation S615.

If a power consumption check mode is set, at least one of power consumption per unit time of each of the plurality of operation units and estimated electricity fee is displayed or printed in operation S620.

The operation after setting a power save mode is similar to the operation illustrated in FIG. 5, and thus the description thereof is omitted.

In this exemplary embodiment, on/off statuses of the plurality of operation units in a power save mode may be ultimately controlled based on power consumption per unit time of each of the plurality of operation units and an estimated electricity fee.

Figure 7:
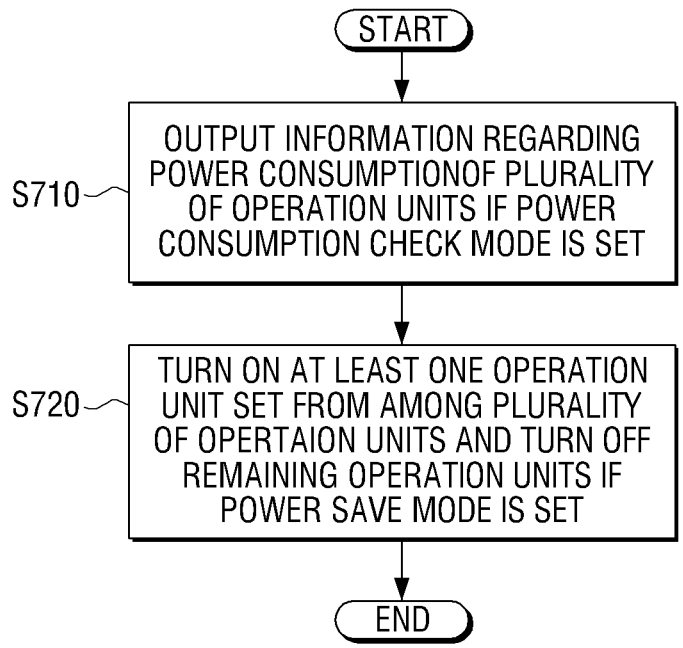
FIG. 7 is a flow chart illustrating a method of controlling power consumption of an image forming apparatus according to an embodiment of the present general inventive concept.

FIG. 7 is a flow chart illustrating a method of controlling power consumption of an image forming apparatus according to another exemplary embodiment of the present general inventive concept. If a power consumption check mode is set, information regarding power consumption of the plurality of operation units is output in operation S710, and if a power save mode is set, at least one operation unit set from among the plurality of operation units is turned on and the remaining operation units are turned off in operation S720.

In this exemplary embodiment, if output of the information regarding power consumption of the plurality of operation units is completed, a power save mode is automatically set, so that at least one operation unit from among the plurality of operation units is turned on and the remaining operation units are turned off.

Figure 8:
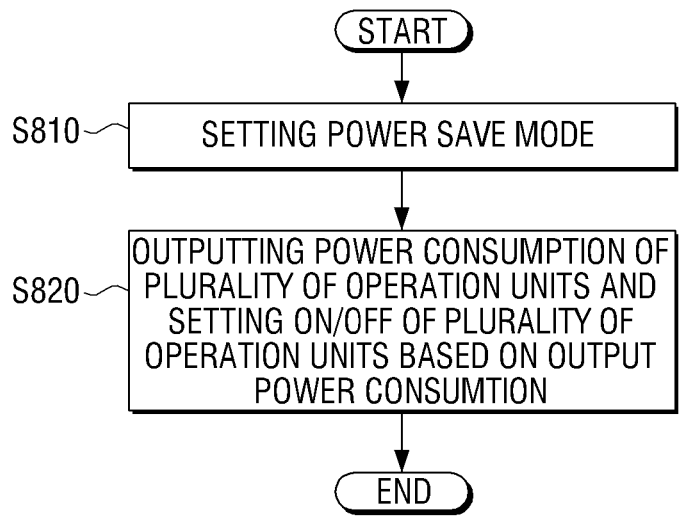
FIG. 8 is a flow chart illustrating a method of controlling power consumption of an image forming apparatus according to an embodiment of the present general inventive concept.

FIG. 8 is a flow chart illustrating a method of controlling power consumption of an image forming apparatus according to another exemplary embodiment of the present general inventive concept. The method may include setting a power save mode in operation S810, outputting the power consumption of the plurality of operation units, and determining whether to turn on or off each of the plurality of operation units based on the output power consumption in operation S820.

If a power save mode is set, power consumption of the plurality of operation units may be displayed or printed. A user may determine whether to turn on or off each of the plurality of operation units by interacting with a UI window (not shown), for example, and the output power consumption may be used to determine whether to turn on or off the plurality of operation units.

The description regarding FIG. 8 that is the same as the description of methods discussed previously is omitted.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit computer-readable code through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling power consumption of an image forming apparatus using a plurality of operation units, comprising:
outputting information regarding power consumption of the plurality of operation units which are used in different image forming operations if it is determined that a power consumption check mode is set;
determining whether a power save mode is set; and
if it is determined that a power save mode is set, operating a power save mode in which at least one operation unit set from among the plurality of operation units is turned on to perform a corresponding image forming operation while the remaining operation units are turned off,
wherein the operating a power save mode comprises changing a preset operation of turn-on and turn-off of the plurality of operating units by using the information regarding power consumption.

2. The method of controlling power consumption of an image forming apparatus of claim 1, further comprising:
receiving a user's command to set the power consumption check mode or the power save mode.

3. The method of controlling power consumption of an image forming apparatus of claim 1, wherein when it is determined that the power save mode is set, outputting information regarding power consumption of the plurality of operation units before turning on or off the plurality of operation units.

4. The method of controlling power consumption of an image forming apparatus of claim 3, wherein, in the operation of the power save mode, power consumption of the plurality of operation units is output and whether to turn on or turn off the plurality of operation units is set based on the output power consumption.

5. The method of controlling power consumption of an image forming apparatus of claim 1, wherein in the operation of the power save mode, if the image forming apparatus is not used for a predetermined period of time, the power save mode is automatically set.

6. The method of controlling power consumption of an image forming apparatus of claim 1, wherein in the operation of the power save mode, if output of the information regarding power consumption of the plurality of operation units is completed, the power save mode is automatically set.

7. The method of controlling power consumption of an image forming apparatus of claim 1, wherein outputting information regarding power consumption includes displaying or printing at least one of power consumption per unit and estimated electricity fee of each of the plurality of operation units based on an operation mode.

8. The method of controlling power consumption of an image forming apparatus of claim 1, wherein outputting information regarding power consumption of the plurality of operation units comprises:
analyzing a power usage pattern based on power consumption of each of the plurality of operation units;
calculating an estimated power consumption for combinations of on/off states of the plurality of operation units based on the analyzed power usage pattern; and
displaying or printing the calculated estimation of power consumption for the combinations of on/off states of the plurality of operation units.

9. The method of controlling power consumption of an image forming apparatus of claim 1, wherein in the operation of the power save mode, if the power save mode is set, a user determines which operation unit should be turned on from among the plurality of operation units.

10. The method of controlling power consumption of an image forming apparatus of claim 1, wherein in the operation of the power save mode, if the power save mode is set, a predetermined setting determines which operation unit should be turned on from among the plurality of operation units.

11. An image forming apparatus comprising;
a plurality of operation units which are used in different image providing operations;
an output unit to output information regarding power consumption of the plurality of operation units if a power consumption check mode is set; and
a control unit to turn on at least one operation unit set from among the plurality of operation units to perform a corresponding image providing operation while the remaining operation units are turned off if a power save mode is set,
wherein the control unit changes a preset operation of turn-on and turn-off of the plurality of operating units by using the information regarding power consumption.

12. The image forming apparatus of claim 11, further comprising:
an input unit to receive a command from a user to set the power consumption check mode or the power save mode.

13. The image forming apparatus of claim 11, wherein the control unit controls the output unit to output information regarding power consumption of the plurality of operation units, and then turns on or off the plurality of operation units if the power save mode is set.

14. The image forming apparatus of claim 13, wherein the control unit outputs power consumption of the plurality of operation units and turns on or off of the plurality of operation units based on the output power consumption.

15. The image forming apparatus of claim 11, wherein the control unit sets the image forming apparatus to the power save mode if the image forming apparatus is not used for a predetermined period of time.

16. The image forming apparatus of claim 11, wherein the control unit sets the image forming apparatus to the power save mode automatically when output of the information regarding power consumption of the plurality of operation units is completed.

17. The image forming apparatus of claim 11, wherein the control unit outputs one of power consumption per unit time of each of the plurality of operation units and estimated electricity fee, and provides the output information to the output unit if the power consumption check mode is set.

18. The image forming apparatus of claim 11, wherein, if the power consumption check mode is set, the control unit analyzes a power usage pattern based on power consumption of each of the plurality of operation units, controls the output unit to output an estimated power consumption for at least one combination of on/off states of the plurality of operation units based on the analyzed power usage pattern, and provides the output estimation of power consumption to the output unit.

19. The image forming apparatus of claim 11, wherein the control unit receives information regarding which operation unit should be turned on from among the plurality of operation units from a user.

20. The image forming apparatus of claim 11, wherein, if the power save mode is set, the control unit checks a predetermined setting state to determine which operation unit should be turned on from among the plurality of operation units.

21. A method of controlling power consumption of an image forming apparatus using a plurality of operation units, comprising:
setting a power save mode;
outputting power consumption of the plurality of operation units which are commonly used in different image providing operations and determining whether to turn on or off the plurality of operation units based on the output power consumption; and
turning on at least one operation unit set from among the plurality of operation units to perform a corresponding image providing operation while the remaining operation units are turned off,
wherein the outputting the power consumption comprises changing a preset operation of turn-on and turn-off the plurality of operating units by using the information regarding power consumption.

22. A method of controlling power consumption of an image forming apparatus comprising a plurality of image forming units, the method comprising:
setting a power saving mode by determining at least one of the plurality of image forming units which performs different image forming operations to turn on and at least one other of the plurality of image forming units to turn off, the at least one image forming unit which is turned on performing a corresponding image forming operation while the at least one other image forming unit is turned off; and
entering the power saving mode,
wherein the entering a power save mode comprises changing a preset operation of turn-on and turn-off the plurality of operating units by using the information regarding power consumption.

23. The method according to claim 22, wherein the image forming units are components of a multi-function image forming apparatus.

24. The method according to claim 23, wherein the image forming units comprise at least one of a printer, a fax, a copier, and a scanner.

25. The method according to claim 22, wherein determining at least one of the plurality of image forming units to turn on and at least one of the plurality of image forming units to turn off comprises receiving an input from a user.

26. The method of claim 22, further comprising:
outputting power consumption information of the plurality of image forming units.

27. The method of claim 26, wherein the power consumption information is output before entering the power saving mode.

28. The method of claim 27, wherein the power consumption information is output before setting the power saving mode.

29. The method according to claim 28, wherein determining at least one of the plurality of image forming units to turn on and at least one of the plurality of image forming units to turn off comprises:
receiving a user input to select at least one of the plurality of image forming units to turn off in a power saving mode.

30. The method according to claim 26, wherein the power consumption information includes at least one of a rate of power consumption and a cost of operation of the plurality of image forming units.

31. The method according to claim 26, wherein the power consumption information includes power consumption information of a plurality of on/off combinations of the plurality of image forming units.

32. The method according to claim 22, wherein entering the power saving mode includes accessing permanent settings in memory to determine which of the plurality of image forming units to turn off in a power saving mode.

33. The method according to claim 22, further comprising:
setting a power consumption mode to analyze power consumption of the plurality of image forming units; and
entering the power consumption mode.

34. The method according to claim 33, wherein setting the power consumption mode includes receiving an input from a user.

35. The method according to claim 33, wherein entering the power consumption mode includes outputting data corresponding to a power consumption of the plurality of image forming units.

36. The method according to claim 35, wherein outputting data includes outputting power consumption data corresponding to a current level of power consumption of the plurality of image forming units.

37. The method according to claim 35, wherein outputting data includes at least one of printing data or displaying data on a display device.

38. The method according to claim 35, wherein outputting data includes outputting power consumption data corresponding to a cumulative power consumption of the plurality of image forming units over a predetermined period of time.

39. The method according to claim 35, wherein outputting data includes outputting power consumption levels of at least one combination of at least one image forming unit to be turned on and at least one image forming unit to be turned off.

40. The method according to claim 39, wherein the at least one combination is based on the monitored usage of the plurality of image forming units over a predetermined period of time.

41. The method according to claim 33, wherein entering the power consumption mode includes monitoring power consumption of the plurality of image forming units.

42. The method according to claim 41, further comprising:
outputting a notice when power consumption of the plurality of image forming units reaches a predetermined level.

43. The method according to claim 41, further comprising:
outputting power consumption data corresponding to the monitored usage of the plurality of image forming units over a predetermined period of time.

44. An energy-saving system of an image forming apparatus comprising a plurality of image forming units, comprising:
a plurality of image forming units to provide an image; and
a controller connected to each of the plurality of image forming units to place the plurality of image forming units in a power saving mode in which at least one of the plurality of image forming units is turned on and at least one other of the plurality of image forming units is turned off, the at least one image forming unit which is turned on performing a corresponding image forming operation while the at least one other image forming unit is turned off, wherein the controller changes a preset operation of turn-on and turn-off the plurality of operating units by using the information regarding power consumption.

45. The energy-saving system according to claim 44, wherein the plurality of image forming units are components of a multi-function imaging apparatus.

46. The energy-saving system according to claim 45, wherein the controller is a component of the imaging apparatus.

47. The energy-saving system according to claim 45, wherein the controller is externally connected to the imaging apparatus.

48. The energy-saving system according to claim 44, further comprising a user interface to receive a user input to select the at least one image forming unit to turn on and the at least one image forming unit to turn off in the power saving mode.

49. The energy-saving system according to claim 48, wherein the user interface displays power consumption information of the plurality of image forming units prior to receiving the user input.

50. The energy-saving system according to claim 49, further comprising a network connection to receive data corresponding to a cost of power consumption of each of the plurality of image forming units, wherein the user interface displays the data corresponding to the cost of power consumption of each of the plurality of image forming units prior to receiving the user input.

51. The energy-saving system according to claim 49, wherein the user interface includes at least one of an electronic display and a printer.

52. The energy-saving system according to claim 51, wherein the printer prints the power consumption information of the plurality of image forming units.

53. The energy-saving system according to claim 44, wherein the plurality of image forming units are separate imaging apparatuses connected to a network.

54. The energy-saving system according to claim 53, wherein the controller is a computer including a processor and memory connected to the network.

55. The energy-saving system according to claim 53, wherein the controller is located in one of the separate imaging apparatuses.

56. An image-forming apparatus, comprising:
a first imaging unit to form a first image;
a second imaging unit different from the first imaging unit to form a second image; and
a controller to determine that the first imaging unit is turned on in a power saving mode and that the second imaging unit is turned off in the power saving mode, and to set the power saving mode according to the determination, the first imaging unit being turned on to perform a corresponding image forming operation while the second imaging unit is turned off,
wherein the controller changes a preset operation of turn-on and turn-off of the first imaging unit and the second imaging unit by using the information regarding power consumption.

57. The image-forming apparatus according to claim 56, wherein the controller sets a normal mode to turn on both the first imaging unit and the second imaging unit.

58. The image-forming apparatus according to claim 57, wherein the controller changes the normal mode to the power saving mode to turn off the second imaging unit.

59. The image-forming apparatus according to claim 56, wherein the controller generates a signal representing a user interface window, such that a user sets the determination for the power saving mode via the user interface window.

60. The image-forming apparatus according to claim 56, wherein the first imaging unit has a first level of power consumption and the second imaging unit has a second level of power consumption greater than the first imaging unit.

* * * * *